(12) United States Patent
Zhang et al.

(10) Patent No.: US 11,582,680 B2
(45) Date of Patent: Feb. 14, 2023

(54) ACCESS CONTROL RELATED METHOD, BASE STATION, AND USER EQUIPMENT

(71) Applicants: SHARP KABUSHIKI KAISHA, Sakai (JP); FG Innovation Company Limited, Tuen Mun (HK)

(72) Inventors: Chongming Zhang, Shanghai (CN); Renmao Liu, Shanghai (CN); Fancying Xiao, Shanghai (CN); Ningjuan Chang, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 824 days.

(21) Appl. No.: 16/475,507

(22) PCT Filed: Dec. 18, 2017

(86) PCT No.: PCT/CN2017/116899
§ 371 (c)(1),
(2) Date: Jul. 2, 2019

(87) PCT Pub. No.: WO2018/126881
PCT Pub. Date: Jul. 12, 2018

(65) Prior Publication Data
US 2019/0327664 A1 Oct. 24, 2019

(30) Foreign Application Priority Data
Jan. 6, 2017 (CN) .......................... 201710012256.8

(51) Int. Cl.
*H04W 48/06* (2009.01)
*H04W 76/18* (2018.01)
*H04W 88/10* (2009.01)

(52) U.S. Cl.
CPC ........... *H04W 48/06* (2013.01); *H04W 76/18* (2018.02); *H04W 88/10* (2013.01)

(58) Field of Classification Search
None
See application file for complete search history.

(56) References Cited

U.S. PATENT DOCUMENTS

| | | |
|---|---|---|
| 2014/0148169 A1 | 5/2014 | Li et al. |
| 2016/0205630 A1* | 7/2016 | Chen ..................... H04W 48/02 455/574 |

(Continued)

FOREIGN PATENT DOCUMENTS

| | | |
|---|---|---|
| CN | 104823504 A | 8/2015 |
| CN | 105532043 A | 4/2016 |
| WO | 2012/006120 A1 | 1/2012 |

OTHER PUBLICATIONS

LG Electronics Inc, "Access Control for NB-CIoT", vol. GERAN WG2, No. Kista, Sweden; Jun. 29, 2015-Jul. 2, 2015, (Jun. 24, 2015), 3GPP Draft; GPC150353 Access Control for NB-CIoT, (3GPP), Mobile Competence Centre ; 650, Route Des Lucioles ; F-06921 Sophia-Antipolis Cedex ; FRANCE, *, chapter 4.3.4. 1chapter 4.3.1 *.

(Continued)

*Primary Examiner* — Hong S Cho
(74) *Attorney, Agent, or Firm* — ScienBiziP, P.C.

(57) ABSTRACT

The present disclosure provides an access control method performed at user equipment (UE), comprising: receiving, from a base station, multiple pieces of access control information corresponding to multiple network types; using the received multiple pieces of access control information to respectively perform an access control check for the multiple network types of networks; starting an access barring timer according to an access control check result; and if the access barring timer times out, informing an upper layer of (Continued)

the UE that barring of access is removed. The present disclosure also provides an access control configuration method for UE performed at a base station, corresponding UE, and a corresponding base station.

4 Claims, 8 Drawing Sheets

(56) References Cited

U.S. PATENT DOCUMENTS

2018/0324675 A1* 11/2018 Lee .................. H04W 28/0289
2019/0261236 A1* 8/2019 Wang ................ H04W 36/0083

OTHER PUBLICATIONS

Huawei, "Network selection and access control framework for eLTE", vol. RAN WG3, No. Reno, Nevada, US; (Nov. 14, 2016), 3GPP Draft; R3-162902 Network Selection and Access Control Framework for eLTE, (3GPP), Mobile Competence Centre ; 650, Route Des Lucioles ; F-06921 Sophia-Antipolis, *chapter 2; figures 1-3 *.

Samsung Electronics, "Discussions on access control for NB-IoT", vol. RAN WG2, No. Budapest, HU; (Jan. 18, 2016), 3GPP Draft; R2-160523 Discussions on Access Control for NB-IoT, (3GPP), Mobile Competence Centre ; 650, Route Des Lucioles ; F-06921 Sophia-Antipolis Cedex ; France, *chapter 2;; figure 1 *.

"Study on New Radio Access Technology", 3GPP TR38.804 V0.3.1 Nov. 2016.

NTT Docomo, "New SID Proposal: Study on New Radio Access Technology", RP-160671, 3GPP TSG RAN Meeting #71 Göteborg, Sweden, 7.-10. Mar. 2016.

Huawei et al., "Network selection and access control framework for eLTE", R2-168196, 3GPP TSG-RAN WG2 Meeting #96 Reno, Nevada, US, Nov. 14-18, 2016.

Huawei, HiSilicon, "Network selection and access control framework for eLTE", R2-168196, 3GPP TSG-RAN WG2 Meeting #96, Reno, Nevada, US, Nov. 14-18, 2016.

* cited by examiner

ACCESS CONTROL RELATED METHOD, BASE STATION, AND USER EQUIPMENT

TECHNICAL FIELD

The present invention relates to the field of wireless communications technologies. More specifically, the present invention relates to an access control related method, a corresponding base station, and corresponding user equipment.

BACKGROUND

With the rapid growth of mobile communication and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject. needing further and intensive study.

For this purpose, at the 3rd Generation Partnership Project (3GPP) RAN #64 plenary session held in March 2016, a research subject on new 5G radio access technology was proposed (see non-patent literature: RP-160671 New SID Proposal: Study on New Radio Access Technology). In the description of the work item, the operating frequency band of future new communication RATs can be expanded to 100 GHz, which will satisfy at least service requirements for enhanced mobile broadband, the demand for communication between massive Internet of Things terminals, service requirements of high reliability requirements, and so on. The research work of the item is expected to end in 2018.

While the study on 5G RATs is ongoing, the study on the technology of the core network supporting 5G access is also carried out. This type of core network can be referred to as a Next Generation Core (NextGen Core), and is different from an Evolved Packet Core (EPC), i.e., a core network connected to an existing Long Term Evolution (LTE) system. The NextGen Core under discussion will be based on a different QoS architecture, and can therefore be considered as a new core network type different from the EPC.

During the study of the 50 access network technology, in order to avoid overlapping investment, operators are allowed to upgrade deployed LTE base stations, such that the upgraded LTE base stations can be connected to the NextGen Core. This new type of base station is referred to as an evolved LTE eNB (eLTE eNB). According to the definition in TR38.804, the eLTE eNB can support connections to the EPC and connections to the NextGen Core.

From the prospect of the access network, an eLTE eNB connected to the EPC can be regarded as an Evolved Universal Terrestrial Radio Access Network (E-UTRAN), and an eLTE eNB connected to the NextGen Core can be regarded as a 5G-RAN. That is, depending on the type of a core network to which an eLTE eNB is connected, a cell covered by the eLTE eNB can be an E-UTRAN or a 5G-RAN cell.

At present, before user equipment (UE) in an idle state initiates a connection establishment request, an access control check needs to be performed according to an access class and service characteristics of the UE.

If a check result indicates that access by the UE is allowed, the UE can continue to initiate the connection establishment request. If the check result indicates that access by the UE is not allowed, the UE starts a timer, and does not initiate the connection establishment request in the current cell while the timer is running, and meanwhile the UE informs an upper layer that establishment of an RRC connection fails.

Since a cell covered by an eLTE eNB may be an E-UTRAN cell or a 5G-RAN cell, the problem to be solved is how to perform an access control check when UE is in a coverage area of the eLTE eNB. The literature R2-168196 introduces the need to broadcast corresponding access control information based on core networks. However, the problem to be solved is how to use the access control information to perform access control to realize flow control.

In addition, the 5G-RAN supports data transmission of UE in an inactive state. The inactive state refers to a UE state in which a base station keeps a context of the UP. The UE in the inactive state can transmit data without performing state switching. Thus, another problem to be solved is how to perform access control on UE in different states.

SUMMARY OF INVENTION

In order to solve at least one of the above problems, the present disclosure provides the following technical solutions.

According to one aspect of the present disclosure, a method performed at user equipment (UE) is provided, comprising:

receiving, from a base station, multiple pieces of access control information corresponding to multiple network types;

using the received multiple pieces of access control information to respectively perform an access control check for the multiple network types of networks;

starting an access barring tinier according to an access control check result; and.

if the access barring timer times out, informing an upper layer of the UE that barring of access is removed.

In one exemplary embodiment, the method further comprises:

if the check result indicates that access to at least one network type of network is barred, respectively starting at least one access barring timer provided for the at least one network type of network, each access barring timer indicating duration of barring of access to a corresponding network type of network.

In one exemplary embodiment, if one of the at least one access barring timer times out, the upper layer of the UE is informed that barring of access to a corresponding network type of network is removed; or, if each of the at least one access barring timer times out, the upper layer of the UE is informed that barring of access to the corresponding network type of network is removed.

In one exemplary embodiment, the method further comprises:

if none of the at least one access barring timer is started, initiating a connection establishment request regarding any one of the at least one network type of network corresponding to the at least one access barring timer that is not started; otherwise, informing the upper layer of the UP that establishment of a connection fails; or if at least one of the at least one access barring timer is not started, initiating a connection establishment request regarding any one of the at least one network type of network corresponding to the at least one of the at least one access barring timer that is not started.

In one exemplary embodiment, the method further comprises:

if the check result indicates that access to at least one network type of network is barred, respectively generating at least one value for the at least one network type of network, each value indicating duration of barring of access to a corresponding network type of network, wherein if each of the at least one value is a valid value, the access barring timer is started, and network access barring duration of the access barring timer is set to a smallest or greatest one of the at least one value, and if at least one of the at least one value is an invalid value, the access barring timer is not started.

In one exemplary embodiment, the multiple pieces of access control information are broadcast in the same or different system information.

According to another aspect of the present disclosure, user equipment (UE) is provided, comprising:

a transceiver, configured to receive, from a base station, multiple pieces of access control information respectively corresponding to multiple network types;

a checking unit, configured to use the received multiple pieces of access control information to respectively perform an access control check for the multiple network types of networks;

a starting unit, configured to start an access barring timer according to an access control check result; and an informing unit, configured to, if the access barring timer times out, inform an upper layer of the UE that barring of access is removed.

In one exemplary embodiment, the starting unit is further configured to: if the check result indicates that access to at least one network type of network is barred, respectively start at least one access barring timer provided for the at least one network type of network, each access barring timer indicating duration of barring of access to a corresponding network type of network, In one exemplary embodiment, the informing unit is further configured to:

if one of the at least one access barring timer times out, inform the upper layer of the UE that barring of access to a corresponding network type of network is removed; or, if each of the at least one access barring timer times out, inform the upper layer of the UE that barring of access to the corresponding network type of network is removed, In one exemplary embodiment, the UE further comprises:

a request unit, wherein the request unit is configured to, if none of the at least one access barring timer is started, initiate a connection establishment request regarding any one of the at least one network type of network corresponding to the at least one access barring timer that is not started; otherwise, the informing unit informs the upper layer of the UE that establishment of a connection fails; or the request unit is configured to, if at least one of the at least one access barring timer is not started, initiate a connection establishment request regarding any one of the at least one network type of network corresponding to the at least one of the at least one access barring timer that is not started, In one exemplary embodiment, the UE further comprises:

a generation unit, configured to, if the check result indicates that access to at least one network type of network is barred, respectively generate at least one value for the at least one network type of network, each value indicating duration of barring of access to a corresponding network type of network, wherein the starting unit is further configured to: if each of the at least one value is a valid value, start the access barring timer, and set network access barring duration of the access barring timer to a smallest or greatest one of the at least one value; and if at least one of the at least one value is an invalid value, skip starting the access barring timer.

In one exemplary embodiment, the multiple pieces of access control information are broadcast in the same or different system information.

According to another aspect of the present disclosure, a method performed at user equipment (UE) is provided, comprising:

selecting from multiple network types a network type to be used for providing a service;

receiving, from a base station, access control information corresponding to the selected network type;

using the received access control information to perform an access control check for the selected network type of network;

starting an access barring timer according to an access control check result; and if the access barring timer times out, informing an upper layer of the UE that barring of access is removed.

In one exemplary embodiment, the selecting a network type to be used for providing a service is based on one of the following:

an indication received from the upper layer of the UE and comprising the selected network type;

network type priority information contained in system information or dedicated signaling received from the base station; and a core network type that has been registered by the UE.

In one exemplary embodiment, the method further comprises:

if the check result indicates that access to the selected network type of network is barred, starting an access barring timer for the selected network type of network, the access barring timer indicating duration of barring of access to the selected network type of network.

In one exemplary embodiment, the same or different access barring timers are started for different network types.

According to another aspect of the present disclosure, user equipment (UE) is provided, comprising:

a selecting unit, configured to select from multiple network types a network type to be used for providing a service;

a transceiver, configured to receive, from a base station, access control information corresponding to the selected network type;

a checking unit, configured to use the received access control information to perform an access control check for the selected network type of network;

a starting unit, configured to start an access barring timer according to an access control check result; and an informing unit, configured to, if the access barring toner tones out, inform an upper layer of the UE that barring of access is removed.

In one exemplary embodiment, the selecting unit selects a network type to be used for providing a service based on one of the following:

an indication received from the upper layer of the UE and comprising the selected network type;

network type priority information contained in system information or dedicated signaling received from the base station; and a core network type that has been registered by the UE.

In one exemplary embodiment, the starting unit is further configured to: if the check result indicates that access to the selected network type of network is barred, start an access barring timer for the selected network type of network, the access barring timer indicating duration of barring of access to the selected network type of network.

In one exemplary embodiment, the same or different access barring timers are started for different network types.

According to another aspect of the present disclosure, a method performed at a base station is provided, comprising:

configuring multiple pieces of access control information respectively corresponding to multiple network types supported by the base station; and sending the multiple pieces of access control information to user equipment (UE).

In one exemplary embodiment, the multiple pieces of access control information are broadcast in the same or different system information.

According to another aspect of the present disclosure, a base station is provided, comprising:

a configuration unit, used to configure multiple pieces of access control information respectively corresponding to different network types supported by the base station; and a transceiver, used to send the multiple pieces of access control information to user equipment (UE).

In one exemplary embodiment, the multiple pieces of access control information are broadcast in the same or different system information, According to another aspect of the present disclosure, a method performed at user equipment (UE) is provided, comprising:

receiving, from a base station, one piece of access control information corresponding to multiple working conditions of the UE or multiple pieces of access control information corresponding to the multiple working conditions of the UE, the multiple working conditions indicating different access requirements of the UE in different states;

using, according to a working condition in which the UE is, the received access control information to perform a network access control check;

starting an access barring timer according to an access control check result; and if the access barring timer times out, informing an upper layer of the UE that barring of access is removed, In one exemplary embodiment, one piece of access control information is used for a network access control check in the multiple working conditions of the UE.

In one exemplary embodiment, multiple pieces of access control information are respectively used for a network access control check in the multiple working conditions of the UE, and the step of performing a network access control check further comprises:

using received access control information corresponding to the working condition in which the UE is to perform an access control check for the working condition In one exemplary embodiment, the working conditions comprise at least the following:

the UE in an idle state or in an inactive state establishes a connection; and the UE in the inactive state transmits data.

In one exemplary embodiment, the method further comprises:

if the check result indicates that access to a network is barred in the working condition in which the UE is, starting an access barring timer for the working condition in which the UE is, the access barring timer indicating duration of barring of access in the working condition in which the UE is.

In one exemplary embodiment, the same access barring timer is started for different working conditions, and if the access barring timer times out, the upper layer of the UE is informed that network access barring is removed.

In one exemplary embodiment, different access barring timers are started for different working conditions, and if a started access barring timer times out, the upper layer of the UE is informed that network access barring for a corresponding working condition is removed.

According to another aspect of the present disclosure, user equipment (UE) is provided, comprising:

a transceiver, configured to receive, from a base station, one piece of access control information corresponding to multiple working conditions of the UE or multiple pieces of access control information corresponding to the multiple working conditions of the UE, the multiple working conditions indicating different access requirements of the UE in different states;

a checking unit, configured to use, according to a working condition in which the UP is, the received access control information to perform a network access control check;

a starting unit, configured to start an access barring timer according to an access control check result; and an informing unit, configured to, if the access barring timer times out, inform an upper layer of the UE that barring of access is removed.

In one exemplary embodiment, one piece of access control information is used for a network access control check in the multiple working conditions of the UE.

In one exemplary embodiment, multiple pieces of access control information are respectively used for a network access control check in the multiple working conditions of the UE, and the checking unit is further configured to:

use received access control information corresponding to the working condition to which the UE is to perform an access control check for the working condition.

In one exemplary embodiment, the working conditions comprise at least the following:

the UE in an idle state or in an inactive state establishes a connection; and the UE in the inactive state transmits data.

In one exemplary embodiment, the starting unit is further configured to: if the check result indicates that access to a network is barred in the working condition in which the UE is, start an access barring timer for the working condition in which the UE is, the access barring timer indicating duration of barring of access in the working condition in which the UE is.

In one exemplary embodiment, the starting unit starts the same access barring timer for different working conditions, and if the access barring timer times out, the informing unit informs the upper layer of the UE that network access barring is removed.

In one exemplary embodiment, wherein different access barring timers are started for different working conditions, and the informing unit is further configured to:

if a started access barring timer times out, inform the upper layer of the UE that network access barring for a corresponding working condition is removed.

According to another aspect of the present disclosure, a method performed at a base station is provided, comprising:

respectively configuring, for multiple working conditions of user equipment (UE), one piece of access control information corresponding to the multiple working conditions or multiple pieces of access control information corresponding to the multiple working conditions, the multiple working conditions indicating different access requirements of the UE in different states; and sending the one or multiple pieces of access control information to the UE, In one exemplary embodiment, the working conditions comprise at least the following:

the UE in an idle state or in an inactive state establishes a connection; and the UE in the inactive state transmits data, In one exemplary embodiment, the multiple pieces of access control information are broadcast in the same or different system information.

According to another aspect of the present disclosure, a base station is provided, comprising:

a configuration unit, used to respectively configure, for multiple working conditions of user equipment (UE), one piece of access control information corresponding to the multiple working conditions or multiple pieces of access control information corresponding to the multiple working conditions, the multiple working conditions indicating different access requirements of the UE in different states; and a transceiver, used to send the one or multiple pieces of access control information to the UE.

In one exemplary embodiment, the working conditions comprise at least the following:

the UE in an idle state or in an inactive state establishes a connection; and the UE in the inactive state transmits data.

In one exemplary embodiment, the multiple pieces of access control information are broadcast in the same or different system information.

According to the technical solutions of the present disclosure, before initiating access or transmitting data, a terminal can perform an access control check according to a network type or a state in which the terminal is, thereby realizing access control and avoiding network congestion.

BRIEF DESCRIPTION OF DRAWINGS

The above and other features of the present disclosure will become more apparent with the following detailed description in conjunction with the accompanying drawings.

DETAILED DESCRIPTION OF EMBODIMENTS

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

In order to better describe the technical solutions of the present disclosure, the embodiments of the present disclosure describe in detail the access control related schemes of the present disclosure by using an example in which access control is performed on UE in a cell (an E-UTRAN cell or a 5G-RAN cell) covered by an eLTE eNB supporting connections to both an EPC and a NextGen Core. However, those skilled in the art should understand that the present disclosure is not limited to the above examples of base stations, UE, access networks, and core networks, and is also applicable to other base stations supporting access to various types of networks, access networks supported thereby, corresponding core networks, and UE in coverage areas thereof.

First and second exemplary embodiments of the present disclosure provide access control schemes for situations in which a base station supports multiple types of network access.

The following describes an access control scheme according to the first exemplary embodiment of the present disclosure in detail with reference to FIGS. 1 to 4.

Figure 1:
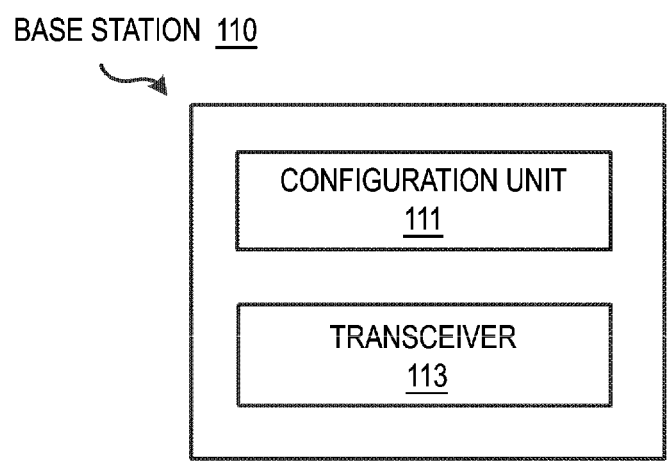
FIG. 1 is a schematic structural block diagram of a base station according to first, second, and third exemplary embodiments of the present invention.

FIG. 1 is a schematic structural block diagram of a base station according to the first exemplary embodiment of the present invention. As shown in FIG. 1, the base station 110 comprises a configuration unit 111 and a transceiver 113. Those skilled in the art should understand that only the configuration unit 111 and the transceiver 113 related to the present invention are shown in the base station 110 of FIG. 1 to avoid confusion of the present invention. However, those skilled in the art should understand that although not shown in FIG. 1, the base station according to the embodiment of the present invention further includes other units that constitute the base station.

In the first exemplary embodiment, the configuration unit 111 is used to configure multiple pieces of access control information respectively corresponding to different network types supported by the base station.

The transceiver 113 is used to send the multiple pieces of access control information to UE.

The multiple pieces of access control information are broadcast in system information by the base station 110 to the UE, and can be broadcast in the same system information or in different system information.

Figure 2:
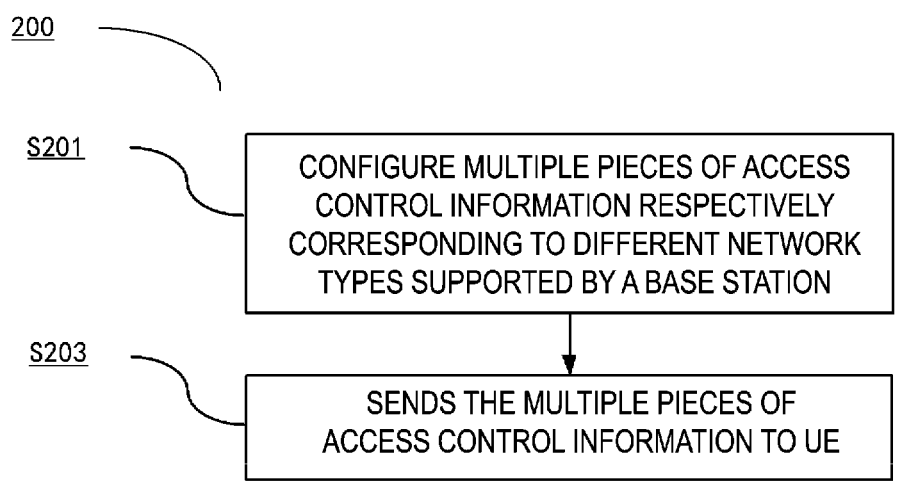
FIG. 2 is a flowchart of an access control configuration method for UE performed at the base station according to the first and second exemplary embodiments of the present invention.

FIG. 2 is a flowchart of an access control configuration method for UE performed at the base station according to the first exemplary embodiment of the present invention.

As shown in FIG. 2, the method 200 comprises steps S201 and S203, and can be performed by the base station 110 shown in FIG. 1.

Specifically, in step S201, the configuration unit 111 of the base station 110 configures multiple pieces of access control information respectively corresponding to different network types supported by the base station 110.

In step S203, the transceiver 113 of the base station 110 transmits the multiple pieces of access control information to UE.

Figure 3:
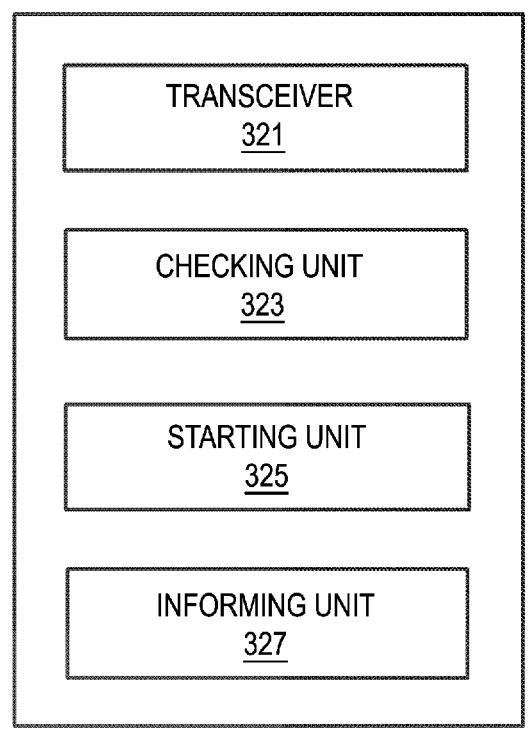
FIG. 3 is a schematic structural block diagram of UE according to the first and third exemplary embodiments of the present invention.

FIG. 3 is a schematic structural block diagram of UE according to the first exemplary embodiment of the present invention. As shown in FIG. 3, the UE 320 comprises a transceiver 321, a checking unit 323, a starting unit 325, and an informing unit 327. Those skilled in the art should understand that only the transceiver 321, the checking unit 323, the starting unit 325, and the informing unit 327 related to the present invention are shown in the UP 320 of FIG. 3 to avoid confusion of the present invention. However, those skilled in the art should understand that although not shown in FIG. 3, the UP according to the embodiment of the present invention further includes other units that constitute the UP.

In the first exemplary embodiment, the transceiver 321 is configured to receive, from the base station, the multiple pieces of access control information respectively corresponding to the multiple network types. The multiple pieces of access control information are broadcast in system information by the base station to the UP 320, and can be broadcast in the same system information or in different system information.

The checking unit 323 is configured to use the received multiple pieces of access control information to respectively perform an access control check for the multiple network types of networks.

The starting unit 325 is configured to start or skip starting an access barring timer according to an access control check result. If the check result indicates that access to at least one network type of network is barred, the access barring timer can be started.

The informing unit 327 is configured to, if the access barring timer times out, inform an upper layer of the UP that barring of access is removed.

In an implementation, the starting unit 325 can, if the check result indicates that access to at least one network type of network is barred, respectively start at least one access barring timer provided for the at least one network type of network, each access barring timer indicating duration of barring of access to a corresponding network type of network.

Correspondingly, the informing unit 327 can, if one of the at least one access barring timer times out, inform the upper layer of the UP that barring of access to a corresponding network type of network is alleviated.

Alternatively, the informing unit 327 can, if each of the at least one access barring timer expires, inform the upper layer of the UP that barring of access to the corresponding network type of network is alleviated.

In an implementation, the UE 320 further comprises a request unit (not shown) configured to, if none of the at least one access barring timer is started, initiate a connection establishment request regarding any one of the at least one network type of network corresponding to the at least one access barring timer that is not started; otherwise, the informing unit 327 informs the upper layer of the UE that establishment of a connection fails.

Alternatively, the request unit can, if at least one of the at least one access barring timer is not started, initiate a connection establishment request regarding any one of the at least one network type of network corresponding to the at least one of the at least one access barring timer that is not started.

In another embodiment, the UE 320 may further comprise a generation unit (not shown) configured to, if the check result indicates that access to at least one network type of network is barred, respectively generate at least one value for the at least one network type of network, each value indicating duration of barring of access to a corresponding network type of network.

Figure 4:
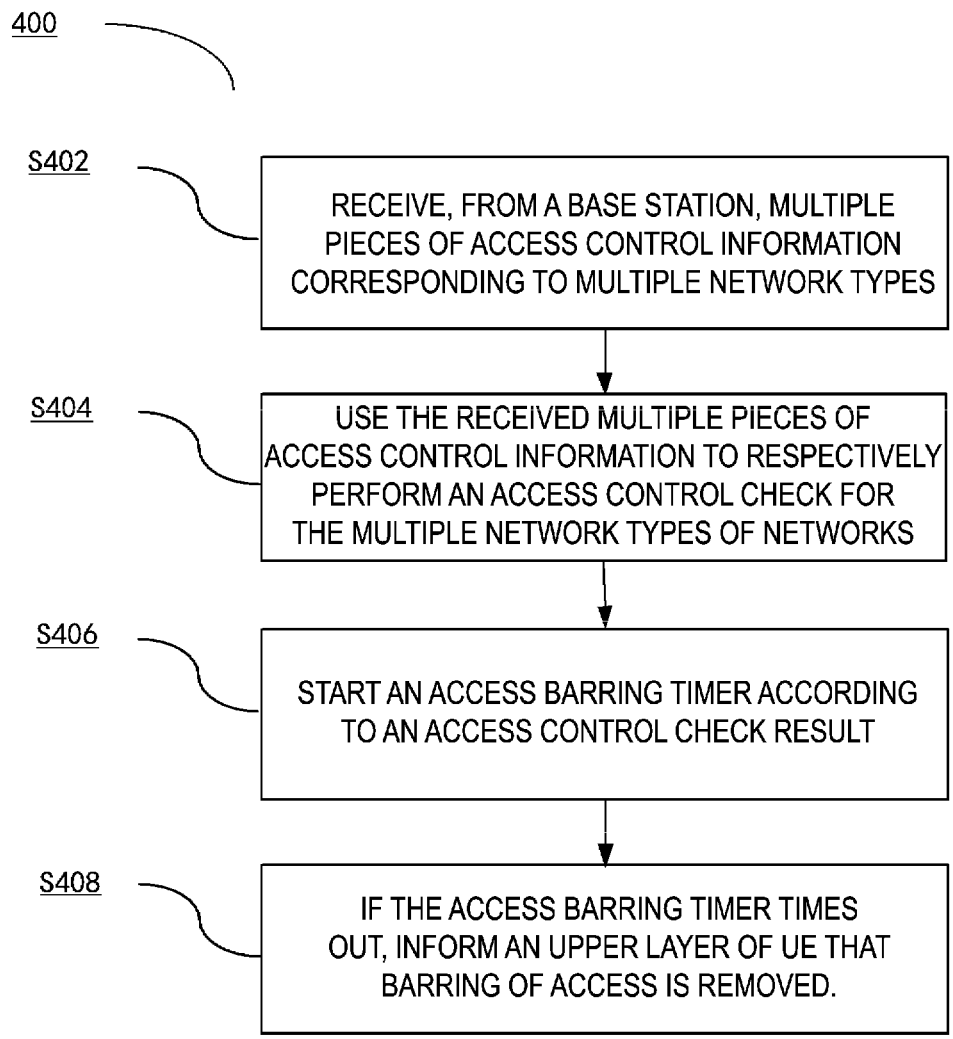
FIG. 4 is a flowchart of an access control method performed at the UE according to the first exemplary embodiment of the present invention.

Correspondingly, the starting unit 325 can be further configured to: if each of the at least one value is a valid value, start an access barring timer, and set network access barring duration of the access barring timer to a smallest or greatest one of the at least one value; and if at least one of the at least one value is an invalid value, skip starting the access barring timer, FIG. 4 is a flowchart of an access control method performed at the UE according to the first exemplary embodiment of the present invention.

As shown in FIG. 4, the method 400 comprises steps S402-S408, and can be performed by the UE 320 shown in FIG. 3, Specifically, in step S402, the transceiver 321 of the UE 320 receives, from the base station, the multiple pieces of access control information respectively corresponding to the multiple network types.

The multiple pieces of access control information corresponding to the different network types (i.e., access network/core network type) are broadcast in system information by the base station to the UE 320, and can be broadcast in the same system information or in different system information.

After the UE 320 receives the above access control information, in step S404, the checking unit 323 of the UE 320 uses the received multiple pieces of access control information to respectively perform an access control check for the multiple network types of networks.

In step S406, the starting unit 325 of the UE 320 starts or skips starting an access barring timer according to an access control check result. If the check result indicates that access to at least one network type of network is barred, the access barring timer can be started.

In step S408, if the access barring timer expires, the informing unit 327 of the UE 320 informs an upper layer of the UE that barring of access is alleviated.

The following describes the access control scheme of the first exemplary embodiment of the present disclosure in detail with reference to an exemplary scenario of the present disclosure.

In the exemplary scenario of the present disclosure, there are, for example, two (but the present disclosure is not limited thereto) different network types, i.e., E-UTRAN/EPC and 5G-RAN/NextGen Core (but the present disclosure is not limited thereto). Correspondingly, there are, for example, two (but the present disclosure is not limited thereto) pieces of access control information: first access control information comprises access control information for an E-UTRAN cell or access control information for a corresponding EPC; second access control information comprises access control information for a 5G-RAN cell or access control information for a corresponding NextGen Core (but the present disclosure is not limited thereto).

As described above, the first and second access control information can be broadcast in the same system information or in different system information.

An access control check can be performed for multiple network types of networks simultaneously or sequentially, and the present disclosure does not limit the sequence of the access control check. For ease of description, it is assumed herein that the UE 320 performs an access control check for the E-UTRAN cell (or for the corresponding EPC, similarly hereinafter) first, and then performs an access control check for the 5G-RAN cell (or for the corresponding NextGen Core, similarly hereinafter).

After the UP 320 performs the access control check for the E-UTRAN cell, if a check result indicates that access is barred, the UE 320 starts (i.e., activating or running, similarly hereinafter) an access barring timer T1 corresponding to the E-UTRAN, the T1 indicating duration of barring of access to the E-UTRAN cell; or, if the check result indicates that access is allowed, the UE 320 does not start the access barring timer T1 corresponding to the E-UTRAN.

Then, after the UE 320 performs the access control check for the 5G-RAN cell, if a check result indicates that access is barred, the UE 320 starts an access barring timer T2 corresponding to the 5G-RAN, the T2 indicating duration of barring of access to the 5G-RAN cell; or, if the check result indicates that access is allowed, the UE 320 does not start the access barring timer T2 corresponding to the 5G-RAN.

In an implementation, if and only if neither of the access barring timers T1 and T2 is started, that is, both of the access control check results corresponding to the two access network/core network types indicate that access is allowed, can the UE 320 initiate a connection establishment request regarding either one of the two access network/core network types of networks. If either one of the access barring timers T1 and T2 is started, the UE 320 can inform an upper layer thereof that establishment of a connection fails.

Alternatively, in another implementation, if only the access barring timer T2 is started, but the access barring timer T1 is not started, the UE 320 can initiate a connection establishment request regarding the E-UTRAN (i.e., based on the E-UTRAN), that is, UE 320 can initiate a service request to the EPC. Specifically, the UE 320 initiates a connection establishment request to the base station, the request explicitly or implicitly indicates the access control check result, and the check result can comprise that the access check result for the E-UTRAN cell is that access is allowed, or alternatively, the check result can comprise that the access check result for the E-UTRAN cell is that access is barred. Specifically, an access request message can comprise two indication bits: a first bit corresponds to the access check result for the E-UTRAN cell, and optionally, a second bit corresponds to the access check result for the 5G-RAN cell. If the value of the bit is "0", it indicates that access is barred; and if the value of the bit is "1", it indicates that access is allowed. Alternatively, system information instructs to use different preambles for random access to the E-UTRAN cell and the 5G-RAN cell, and according to the access check result, the UE 320 sends a preamble corresponding to the E-UTRAN cell when initiating an E-UTRAN-based connection establishment request. According to the check result, the base station routes the service request of the UE 320 to a corresponding core network, which is the EPC in this example.

Similarly, if only the access barring timer T1 is started, but the access barring timer T2 is not started, the UE 320 can initiate a connection establishment request related to the 5G-RAN (i.e., based on the 5G-RAN), that is, the UE 320 can initiate a service request to the NextGen Core. Specifically, the UE 320 initiates a connection establishment request to the base station, the request explicitly or implicitly indicates the access control check result, and the check result can comprise that the access check result for the 5G-RAN cell is that access is allowed, or alternatively, the check result can comprise that the access check result for the 5G-RAN cell is that access is barred. According to the check result, the base station routes the service request of the UE 320 to a corresponding core network, which is the NextGen Core in this example.

If both of the access barring timers T1 and T2 are started, when the access barring timer T1 is running, the UE 320 cannot initiate, in the cell, access to the E-UTRAN, that is, the UE 320 cannot initiate the service request to the EPC; and when the access barring timer T2 is running, the UE 320 cannot initiate, in the cell, access to the 5G-RAN, that is, the UE 320 cannot initiate the service request to the NextGen Core. Optionally, the UE 320 informs the upper layer that establishment of an RRC connection fails.

In an implementation, if the access barring timer T1 expires, the UE 320 can indicate to the upper layer (i.e., a higher layer or a non-access stratum, similarly hereinafter) that barring of E-UTRAN-based access is alleviated or that barring of access for requesting a service from the EPC is alleviated.

Similarly, if the access barring timer T2 expires, the UE 320 can indicate to the upper layer that barring of 5G-RAN-based access is alleviated or that barring of access for requesting a service from the NextGen Core is alleviated.

Alternatively, in another implementation, only if both the access barring timers T1 and T2 expires, can the UE 320 indicate to the upper layer that barring of access is alleviated. Optionally, the UE 320 can reinitiate an access control check.

The above describes the implementation in which one access barring timer is provided for each different network type to perform access control on a corresponding network type of network. In another implementation, only one access barring timer may be provided for different network types.

In this implementation, if the check result indicates that access to at least one network type of network is barred, at least one value is respectively generated for the at least one network type of network, each value indicating duration of barring of access to a corresponding network type of network. If each of the at least one value is a valid value, an access barring timer is started, and network access barring duration of the access barring timer is set to a smallest or greatest one of the at least one value; or, if at least one of the at least one value is an invalid value, the access barring timer is not started.

Referring to the exemplary scenario of the present disclosure, after the UE 320 performs the access control check for the E-UTRAN cell, if the check result indicates that access is barred, the UE 320 obtains a value V1 used for indicating duration of barring of access to the E-UTRAN; or, if the check result indicates that access is allowed, the UE 320 can obtain a value indicating that duration of barring of access to the E-UTRAN is 0, or V1 is set to 0, or V1 is set to an invalid value.

Similarly, after the UE 320 performs the access control check for the 5G-RAN cell, if the check result indicates that access is barred, the UE 320 obtains a value V2 used for indicating duration of barring of access to the 5G-RAN; or, if the check result indicates that access is allowed, the UE 320 can obtain a value indicating that duration of barring of access to the 5G-RAN is 0, or V2 is set to 0, or V2 is set to an invalid value.

If both V1 and V2 are valid values (the valid values can be 0), the value of the access barring timer can be the smaller one of V1 and V2 or the larger one of V1 and V2. If the value of the access barring timer is 0, the UE 320 does not start the access barring timer. If the value of the access barring timer is not 0, the UE 320 starts the access barring timer.

If at least one of V1 and V2 is an invalid value or both V1 and V2 are invalid values, the UE 320 does not start the access barring timer.

If the access barring timer T1 times out, the UE 320 can indicate to the upper layer that barring of access is removed or that barring of access for requesting a service from any core network is removed. Optionally, the UE 320 initiates an access request.

The following describes the access control scheme according to the second exemplary embodiment of the present disclosure in detail with reference to FIGS. 1 and 2 and FIGS. 5 and 6.

The structure of the base station and the base station side method according to the second exemplary embodiment of the present invention are identical to the structure of the base station and the base station side method according to the first exemplary embodiment of the present invention, and therefore the descriptions thereof are omitted herein. Details may be referred to the foregoing descriptions on FIGS. 1 and 2.

Figure 5:
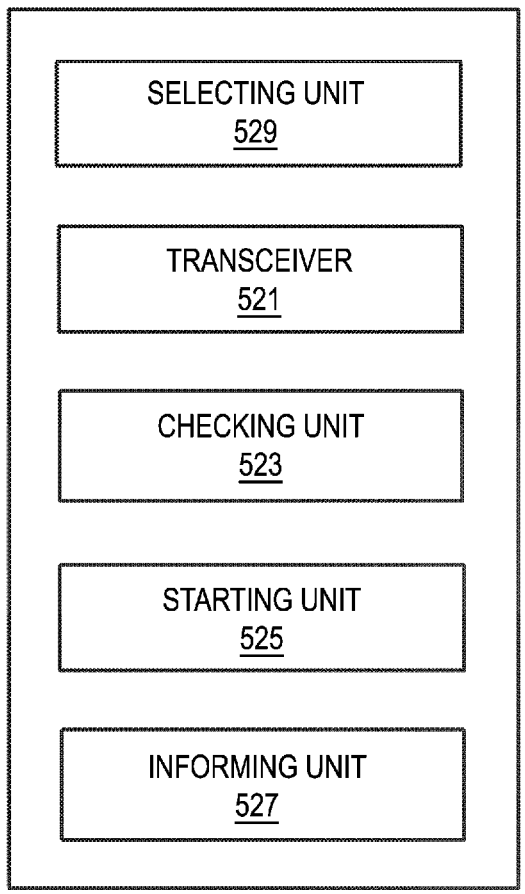
FIG. 5 is a schematic structural block diagram of UE according to the second exemplary embodiment of the present invention.

FIG. 5 is a schematic structural block diagram of UE according to the second exemplary embodiment of the present invention, As shown in FIG. 5, the UE 520 comprises a transceiver 521, a checking unit 523, a starting unit 525, an informing unit 527, and a selecting unit 529. Those skilled in the art should understand that only the transceiver 521, the checking unit 523, the starting unit 525, the informing unit 527, and the selecting unit 529 related to the present invention are shown in the UE 520 of FIG. 5 to avoid confusion of the present invention. However, those skilled in the art should understand that although not shown in FIG. 5, the UE according to the embodiment of the present invention further includes other units that constitute the UE.

In the second exemplary embodiment, the selecting unit 529 is configured to select from multiple network types a network type to be used for providing a service. Once the network type is selected, the UE 520 receives one piece of access control information corresponding to the selected network type, so as to perform a corresponding access control check based on the received access control information.

Correspondingly, the transceiver 521 is configured to select the access control information corresponding to the selected network type from multiple pieces of access control information corresponding to multiple network types and transmitted by a base station.

The checking unit 523 is configured to use the received access control information to perform the access control check corresponding to the selected network type of network.

The starting unit 525 is configured to start or skip starting an access barring timer according to an access control check result. If the check result indicates that access to the selected network type of network is barred, the access barring timer can be started. Specifically, the starting unit 525 can be configured to, if the check result indicates that access to the selected network type of network is barred, start the access barring timer for the selected network type of network, the access barring timer indicating duration of barring of access to the selected network type of network.

The starting unit 525 can start the same or different access barring timers for different network types.

The informing unit 527 is configured to, if the access barring timer expires, inform an upper layer of the UP that barring of access is alleviated.

In an implementation, the selecting unit 529 can select, according to an indication received from the upper layer of the UP and comprising the selected network type, a network type to be used for providing a service.

Alternatively, the selecting unit 529 can select, according to network type priority information contained in system information or dedicated signaling received from the base station, a network type to be used for providing a service.

Alternatively, the selecting unit 529 can select, according to a core network type that has been registered by the UE, a network type to be used for providing a service.

Figure 6:
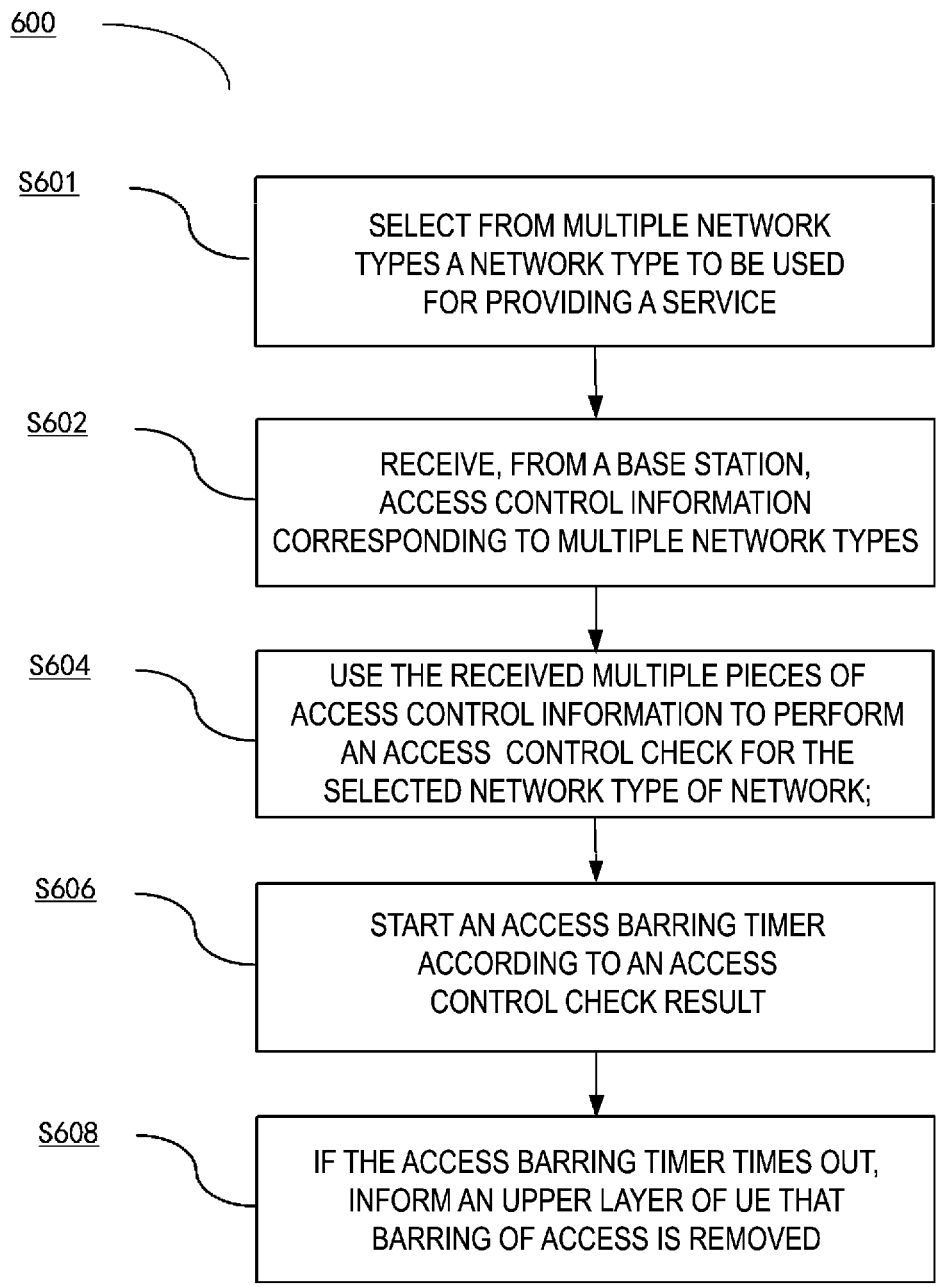
FIG. 6 is a flowchart of an access control method performed at the UE according to the second exemplary embodiment of the present invention.

FIG. 6 is a flowchart of an access control method performed at the UP according to the second exemplary embodiment of the present invention.

As shown in FIG. 6, the method 600 comprises steps S601-S608, and can be performed by the UE 520 shown in FIG. 5.

Specifically, in step S601, the selecting unit 529 of the UE 520 selects from multiple network types a network type to be used for providing a service.

In step S602, the transceiver 521 of the UP 520 selects access control information corresponding to the selected network type from multiple pieces of access control information corresponding to multiple network types and transmitted by a base station.

The multiple pieces of access control information corresponding to the different network types (i.e., access network/core network type) are broadcast in system information by the base station to the UE 520, and can be broadcast in the same system. information or in different system information.

In step S604, the checking unit 523 of the UP 520 uses the received access control information to perform an access control check for the selected network type of network.

In step S606, the starting unit 525 of the UE 520 starts or skips starting an access barring timer according to an access control check result. If the check result indicates that access to the selected network type of network is barred, the access barring timer can be started. Specifically, the starting unit 525 can, if the check result indicates that access to the selected network type of network is barred, start the access barring timer for the selected network type of network, the access barring timer indicating duration of barring of access to the selected network type of network.

In step S608, if the access barring timer expires, the informing unit 527 of the UE 520 informs an upper layer of the UE that barring of access is alleviated.

The following describes the access control scheme of the second exemplary embodiment of the present disclosure in detail with reference to an exemplary scenario of the present disclosure.

In the exemplary scenario of the present disclosure, for example, two (but the present disclosure is not limited thereto) different network types are present, i.e., E-UTRAN/EPC and 5G-RAN/NextGen Core (but the present disclosure is not limited thereto). Correspondingly, there are, for example, two (but the present disclosure is not limited thereto) pieces of access control information: first access control information comprises access control information for an E-UTRAN cell or access control information for a corresponding EPC; second access control information comprises access control information for a 5G-RAN cell or access control information for a corresponding NextGen Core (but the present disclosure is not limited thereto).

As described above, the first and second access control information can be broadcast in the same system information or in different system information.

Different from the first exemplary embodiment, the UE 520 according to the second exemplary embodiment needs to select a corresponding access network type or a corresponding core network type, and receive one corresponding kind of access control information according to the selected access network type or the corresponding core network type, so as to perform a corresponding access control check based on the received access control information.

As described above, a process of selecting an access network type or a corresponding core network type may comprise the following:

The UE 520 receives an indication from an upper layer thereof, the indication comprising a selected access network/ core network type; or the UE 520 obtains access network/core network type priority information from broadcast system information or dedicated signaling sent from the network side, and selects an access network/core network type according to the priority information; or the UE 520 selects an access network/core network type according to a core network type that has been registered by the UE.

Once the access network/core network type is selected, the UE 520 receives one piece of access control information corresponding to the selected access network/core network type, so as to perform a corresponding access control check based on the received access control information.

For example, the UE 520 selects the 5G-RAN access network or the NextGen Core core Network according to the above method, and the UE 520 only needs to receive system information comprising the above second access control information and perform the access control check according to the content of the second access control information.

After the UE 520 performs the corresponding access control check, if a check result indicates that access is barred, the UE 520 starts an access barring timer, and optionally, the UE 520 informs the upper layer that establishment of a connection fails; otherwise, the UE 520 directly initiates a connection establishment request.

No matter which access network/core network type is selected, if the check result indicates that access is barred, the UE 520 can start the same access barring timer for different access network/core network types.

Preferably, e UE 520 can start different access barring timers for different access network/core network types. For example, if the UE 520 selects the E-UTRAN access network or the EPC core network, and if access is barred, an access barring timer T1 is started; if the UE 520 selects the 5G-RAN access network or the NextGen Core core network, and if access is barred, an access barring timer T2 is started.

As described above, the 5G-RAN supports data transmission of UE in an inactive state. The inactive state refers to a UE state in which a base station keeps a context of the UE. The UE in the inactive state can transmit data without performing state switching. Therefore, the UE needs to initiate an access control check in at least the following two working conditions:

1) the UE in an idle state or in the inactive state establishes a connection; and 2) the UE in the inactive state transmits data.

A third exemplary embodiment of the present disclosure provides an access control scheme for the above scenario.

The following describes the access control scheme according to the third exemplary embodiment of the present disclosure in detail with reference to FIGS. 1 and 7 and FIGS. 3 and 8.

Refer to FIG. 1 for a schematic structural block diagram of a base station according to the third exemplary embodiment of the present invention. As shown in FIG. 1, the base station 110 comprises a configuration unit 111 and a transceiver 113. Those skilled in the art should understand that only the configuration unit 111 and the transceiver 113 related to the present invention are shown in the base station 110 of FIG. 1 to avoid confusion of the present invention. However, those skilled in the art should understand that although not shown in FIG. 1, the base station according to the embodiment of the present invention further includes other units that constitute the base station.

In the third exemplary embodiment, the configuration unit 111 is used to configure, for multiple working conditions of UE, one piece of access control information corresponding to the multiple working conditions (that is, one piece of access control information is used for a network access control check in the multiple working conditions of the UE) or multiple pieces of access control information corresponding to the multiple working conditions (that is, multiple pieces of access control information are respectively used for a network access control check in the multiple working conditions of the UE). The multiple working conditions indicate different access requirements of the UE in different states, and comprise at least the following: the UE in an idle state or in an inactive state establishes a connection; and the UE in the inactive state transmits data.

The transceiver 113 is used to send the one or multiple pieces of access control information to the UE.

The multiple pieces of access control information are broadcast in system information by the base station 110 to the UE, and can be broadcast in the same system information or in different system information.

Figure 7:
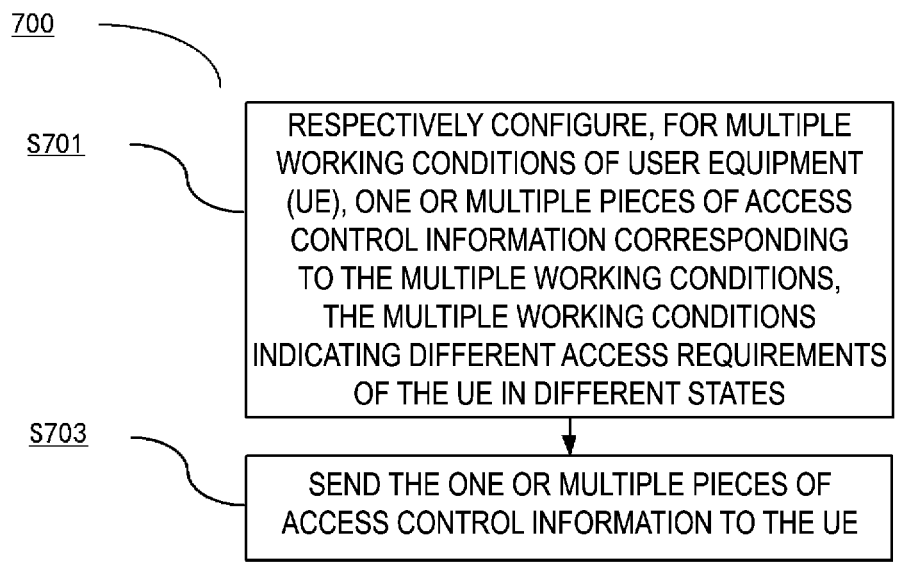
FIG. 7 is a flowchart of an access control configuration method for the UE performed at the base station according to the third exemplary embodiment of the present invention.

FIG. 7 is a flowchart of an access control configuration method for UE performed at base station according to the third exemplary embodiment of the present invention.

As shown in FIG. 7, the method 700 comprises steps S701 and S703, and can be performed by the base station 110 shown in FIG. 1.

Specifically, in step S701, the configuration unit 111 of the base station 110 configures, for multiple working conditions of the UE, one piece of access control information corresponding to the multiple working conditions (that is, one piece of access control information is used for a network access control check in the multiple working conditions of the UE) or multiple pieces of access control information corresponding to the multiple working conditions (that is, multiple pieces of access control information are respectively used for a network access control check in the multiple working conditions of the UE). The multiple working conditions indicate different access requirements of the UE in different states, and comprise at least the following: the UE in the idle state or in the inactive state establishes a connection; and the UE in the inactive state transmits data.

In step S703, the transceiver 113 of the base station 110 sends the one or multiple pieces of access control information to the UE.

The multiple pieces of access control information are broadcast in system information by the base station 110 to the UE, and can be broadcast in the same system information or in different system information, Refer to FIG. 3 for a schematic structural block diagram of UE according to the third exemplary embodiment of the present invention. As shown in FIG. 3, the UE 320 comprises a transceiver 321, a checking unit 323, a starting unit 325, and an informing unit 327. Those skilled in the art should understand that only the transceiver 321, the checking unit 323, the starting unit 325, and the informing unit 327 related to the present invention are shown in the UE 320 of FIG. 3 to avoid confusion of the present invention. However, those skilled in the art should understand that although not shown in FIG. 3, the UE according to the embodiment of the present invention further includes other units that constitute the UE.

In the third exemplary embodiment, the transceiver 321 is configured to receive, from the base station, one piece of access control information corresponding to the multiple working conditions of the UE (that is, one piece of access control information is used for a network access control check in the multiple working conditions of the UE) or multiple pieces of access control information respectively corresponding to the multiple working conditions of the UE (that is, multiple pieces of access control information are respectively used for a network access control check in the multiple working conditions of the UE). The multiple working conditions indicate different access requirements of the UE in different states, and comprise at least the following: the UE in an idle state or in an inactive state establishes a connection; and the UE in the inactive state transmits data. If multiple pieces of access control information respectively corresponding to the multiple working conditions of the UP are received from the base station, the multiple pieces of access control information are broadcast in system information by the base station to the UE 320, and can be broadcast in the same system information or in different system information.

The checking unit 323 is configured to, according to a working condition in which the UE is, use the received access control information to perform the network access control check.

If multiple pieces of access control information respectively corresponding to the multiple working conditions of the UE are received from the base station, the checking unit 323 is specifically configured to use received access control information corresponding to the working condition in which the UE is to perform an access control check for the working condition.

The starting unit 325 is configured to start or skip starting an access barring timer according to an access control check result. If the check result indicates that access to a network is barred in the working condition in which the UE is, the access barring timer can be started.

Specifically, if the check result indicates that access to a network is barred in the working condition in which the UE is, the starting unit 325 starts an access barring timer for the working condition in which the UE is, the access barring timer indicating duration of barring of access in the working condition in which the UE is.

The starting unit 325 can start the same or different access barring timers for different working conditions.

The informing unit 327 is configured to, if the access barring timer times out, inform an upper layer of the UE that barring of access is removed.

If the starting unit 325 starts the same access barring timer for different working conditions, and if the access barring timer times out, the informing unit 327 informs the upper layer of the UE that network access barring is removed.

If the starting unit 325 starts different access barring timers for different working conditions, and if a started access barring timer times out, the informing unit 327 informs the upper layer of the UP that network access barring for a corresponding working condition is removed.

Figure 8:
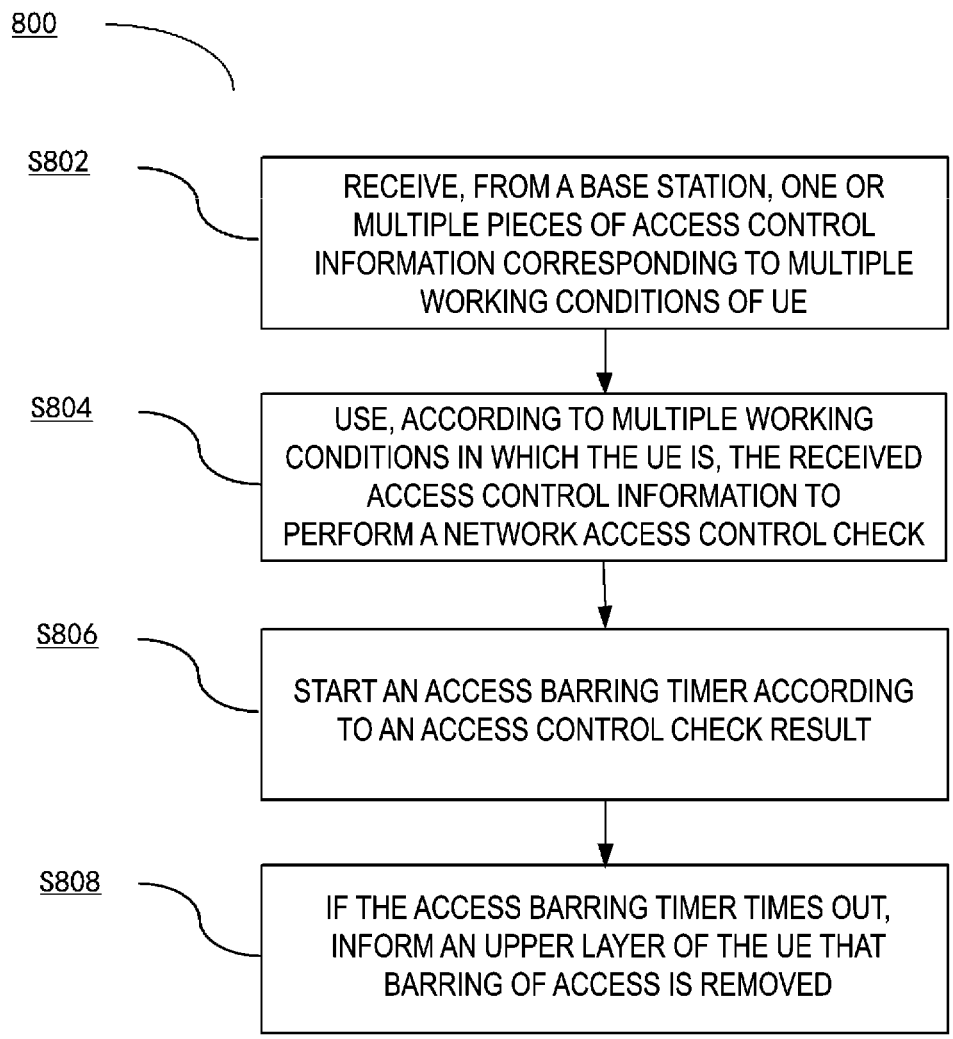
FIG. 8 is a flowchart of an access control method performed at the UE according to the third exemplary embodiment of the present invention.

FIG. 8 is a flowchart of an access control method performed at the UP according to the third exemplary embodiment of the present invention.

As shown in FIG. 8, the method 800 comprises steps S802-S808, and can be performed by the UE 320 shown in FIG. 3.

Specifically, in step S802, the transceiver 321 of the UE 320 receives, from the base station, one piece of access control information corresponding to the multiple working conditions of the UE (that is, one piece of access control information is used for a network access control check in the multiple working conditions of the UE) or multiple pieces of access control information respectively corresponding to the multiple working conditions of the UE (that is, multiple pieces of access control information are respectively used for a network access control check in the multiple working conditions of the UE). The multiple working conditions indicate different access requirements of the UE in different states, and comprise at least the following: the UE in an idle state or in an inactive state establishes a connection; and the UE in the inactive state transmits data. If multiple pieces of access control information respectively corresponding to the multiple working conditions of the UE are received from the base station, the multiple pieces of access control information are broadcast in system information by the base station to the UE 320, and can be broadcast in the same system information or in different system information.

In step S804, the checking unit 323 of the UE 320 uses, according to a working condition in which the UE is, the received access control information to perform the network access control check.

If multiple pieces of access control information respectively corresponding to the multiple working conditions of the UP are received from the base station, the checking unit 323 can use received access control information corresponding to the working condition in which the UE is to perform an access control check for the working condition.

In step S806, the starting unit 325 of the UE 320 is configured to start or skip starting an access barring timer according to an access control check result. If the check result indicates that access to a network is barred in the working condition in which the UE is, the access barring timer can be started.

Specifically, if the check result indicates that access to a network is barred in the working condition in which the UE is, the starting unit 325 starts an access barring timer for the working condition in which the UE is, the access barring timer indicating duration of barring of access in the working condition in which the UE is.

The starting unit 325 can start the same or different access barring timers for different working conditions.

In step S808, if the access barring timer times out, the informing unit 327 of the UE 320 informs an upper layer of the UP that barring of access is removed.

If the starting unit 325 starts the same access barring timer for different working conditions, and if the access barring timer times out, the informing unit 327 informs the upper layer of the UE that network access barring is removed.

If the starting unit 325 starts different access barring timers for different working conditions, and if a started access barring timer times out, the informing unit 327 informs the upper layer of the UE that network access barring for a corresponding working condition is removed.

The following describes the access control scheme of the third exemplary embodiment of the present disclosure in detail with reference to another exemplary scenario of the present disclosure.

In the exemplary scenario of the present disclosure, the UE can initiate an access control check in, for example, two working conditions (but the present disclosure is not limited thereto):

1) the UE in an idle state or in the inactive state establishes a connection; and 2) the UE in the inactive state transmits data.

The base station can configure for the UE one piece of access control information corresponding to the two working conditions, that is, one piece of access control information is used for a network access control check in the two working conditions of the UE.

If a check result indicates that access is barred, the UE starts an access barring timer, and optionally informs the upper layer that access fails.

Optionally, the UE can start different access barring timers for the above different working conditions. For example, the UE performs an access control check in working condition 1), and if a check result indicates that access is barred, the UE starts/activates an access barring timer T3; and the UE performs an access control check in working condition 2), and if a check result indicates that access is barred, the UE starts/activates an access barring timer T4.

If the access barring timer T3 times out, the UE can indicate to the upper layer that barring of establishment of a connection in the idle state or in the inactive state is removed; and if the access barring timer T4 times out, the UE can indicate to the upper layer that barring of data transmission in the inactive state is removed.

In another implementation, the base station can configure for the UE two pieces of access control information corresponding to the two working conditions, that is, two pieces of access control information are respectively used for a network access control check in the two working conditions of the UE.

For example, third access control information is used for an access control check performed when the UE in the idle state or in the inactive state establishes a connection; and fourth access control information is used for performing access control when the UE in the inactive state transmits data.

After receiving the above information, the UE selects, according to a state in which the UE is or an access requirement (for example, establishment of a connection or transmission of data) corresponding access control information for access control. For example, if the UE is in the inactive state and needs to initiate establishment of a connection, the UE uses the third access control information to perform access control. For another example, the UE is in the inactive state and needs to transmit data, the UE uses the fourth access control information to perform access control.

Optionally, an access barring timer activated based on the third access control information and an access barring timer activated based on the fourth access control information can be the same or different. If the two access barring timers are different, for example, the access barring timer activated based on the third access control information is T5 and the access barring timer activated based on the fourth access control information is T6, the UE can indicate to the upper layer that barring of establishment of a connection in the idle state or in the inactive state is removed if the access barring timer T5 times out; and the UE can indicate to the upper layer that barring of data transmission in the inactive state is removed if the access barring timer T6 times out.

The program running on the device according to the present invention may be a program that enables the computer to implement the functions of the embodiments of the present invention by controlling the central processing unit (CPU). The program or information processed by the program can be stored temporarily in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the above embodiments may be implemented or executed by circuits (e.g., monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. A user equipment, comprising:
   at least one processor; and
   at least one memory in electronic communication with the
      at least one processor, wherein instructions stored in the
      at least one memory are executable by the at least one
      processor to:
   receive two kinds of access control information associated
      with an Evolved Packet Core Network (EPC) and
      another type of core network, respectively, the two
      kinds of access control information being broadcast by
      a base station connecting to both the EPC and the other type of core network, wherein the user equipment has been registered to one of the EPC and the other type of core network;

perform an access control check for the one of the EPC and the other type of core network based on the kind of access control information associated with the one of the EPC and the other type of core network while the user equipment is in a radio resource control (RRC) inactive state or an RRC idle state establishing an RRC connection;

start an access barring timer when a result of the access control check indicates that access to the one of the EPC and the other type of core network is barred; and inform an upper layer of the user equipment that the barring is alleviated when the access barring timer expires.

2. A method performed by a user equipment, the method comprising:

receiving two kinds of access control information associated with an Evolved Packet Core Network (EPC) and another type of core network, respectively, the two kinds of access control information being broadcast by a base station connecting to both the EPC and the other type of core network, wherein the user equipment has been registered to one of the EPC and the other type of core network;

performing an access control check for the one of the EPC and the other type of core network based on the kind of access control information associated with the one of the EPC and the other type of core network while the user equipment is in a radio resource control (RRC) inactive state of an RRC idle state establishing an RRC connection;

starting an access barring timer when a result of the access control check indicates that access to the one of the EPC and the other type of core network is barred; and informing an upper layer of the user equipment that the barring is alleviated when the access barring timer expires.

3. A base station that supports connections to both an Evolved Packet Core Network (EPC) and another type of core network, comprising:

at least one processor configured to configure two kinds of access control information comprising a first kind of access control information being used for an access control check corresponding to the EPC, and a second kind of access control information being used for an access control check corresponding to the other type of core network; and transmitting circuitry configured to broadcast the two kinds of access control information, wherein:

a user equipment receives the two kinds of access control information broadcast by the base station, the user equipment has been registered to one of the EPC and the other type of core network, and the broadcast two kinds of access control information are configured to cause the user equipment to:

perform an access control check for the one of the EPC and the other type of core network based on the two kinds of access control information received by the user equipment while the user equipment is in an RRC inactive state or an RRC idle state establishing an RRC connection;

start an access barring timer when a result of the access control check indicates that access to the one of the EPC and the other type of core network is barred; and inform an upper layer of the user equipment that the barring is alleviated when the access barring timer expires.

4. A method performed by a base station that supports connections to both an Evolved Packet Core Network (EPC) and another type of core network, comprising:

configuring two kinds of access control information comprising a first kind of access control information being used for an access control check corresponding to the EPC and a second kind of access control information being used for an access control check corresponding to the other type of core network; and broadcasting the two kinds of access control information, wherein:

a user equipment receives the two kinds of access control information broadcast by the base station, the user equipment has been registered to one of the EPC and the other type of core network, and the broadcast two kinds of access control information are configured to cause the user equipment to:

perform an access control check for the one of the EPC and the other type of core network based on the two kinds of access control information received by the user equipment while the user equipment is in an RRC inactive state or an RRC idle state establishing an RRC connection;

start an access barring timer when a result of the access control check indicates that access to the one of the EPC and the other type of core network is barred; and inform an upper layer of the user equipment that the barring is alleviated when the access barring timer expires.

* * * * *